US012673000B2

(12) United States Patent
Zhakypov et al.

(10) Patent No.: US 12,673,000 B2
(45) Date of Patent: Jul. 7, 2026

(54) FLUID-ACTUATED HAPTIC DEVICE AND METHODS FOR USING THEREOF

(71) Applicant: ECOLE POLYTECHNIQUE FEDERALE DE LAUSANNE (EPFL), Lausanne (CH)

(72) Inventors: Zhenishbek Zhakypov, Lausanne (CH); Jamie Paik, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 748 days.

(21) Appl. No.: 18/010,775

(22) PCT Filed: May 12, 2021

(86) PCT No.: PCT/IB2021/054044
§ 371 (c)(1),
(2) Date: Dec. 15, 2022

(87) PCT Pub. No.: WO2021/260456
PCT Pub. Date: Dec. 30, 2021

(65) Prior Publication Data
US 2023/0263687 A1 Aug. 24, 2023

(30) Foreign Application Priority Data
Jun. 26, 2020 (WO) .................. PCT/IB2020/056074

(51) Int. Cl.
*A61H 1/02* (2006.01)
*A61H 39/00* (2006.01)
*G06F 3/01* (2006.01)

(52) U.S. Cl.
CPC ......... *A61H 1/0288* (2013.01); *A61H 39/002* (2013.01); *G06F 3/014* (2013.01);
(Continued)

(58) Field of Classification Search
CPC ...... A61H 1/02; A61H 1/0285; A61H 1/0288; G06F 3/011–016
See application file for complete search history.

(56) References Cited

U.S. PATENT DOCUMENTS 4,274,399 A * 6/1981 Mummert ............ A61H 1/0288
128/DIG. 20
4,807,606 A * 2/1989 Hasegawa ............ A61H 1/0288
128/DIG. 20
(Continued)

OTHER PUBLICATIONS

Rosset, Samuel, et al., "Flexible and Stretchable Electrodes for Dielectric Elastomer Actuators", Applied Physics A, vol. 110, Issue 2, Feb. 2013, pp. 281-307.
(Continued)

*Primary Examiner* — Joseph D. Boecker
*Assistant Examiner* — Thomas W Greig
(74) *Attorney, Agent, or Firm* — Nixon & Vanderhye, PC

(57) ABSTRACT
A haptic device is disclosed comprising at least one fluidic actuator operatively connectable with pumping means; and a plurality of movable members mechanically connected with said at least one fluidic actuator, wherein said movable members can perform a displacement upon actuation of the fluidic actuator and/or resist the movements of a body part of a user upon actuation of the fluidic actuator, to provide a tactile and/or force haptic sensation to a body part of a user. Methods for providing a haptic sensation to a user and receiving haptic input commands from a user are also disclosed.

19 Claims, 4 Drawing Sheets

(52) U.S. Cl.
CPC ...... *G06F 3/016* (2013.01); *A61H 2201/1238*
(2013.01); *A61H 2201/5071* (2013.01); *A61H*
*2205/067* (2013.01)

(56) References Cited

U.S. PATENT DOCUMENTS

| | | | | |
|---|---|---|---|---|
| 5,333,605 | A * | 8/1994 | Matsumura | A61H 1/0288 601/40 |
| 8,425,438 | B2 * | 4/2013 | Fujimoto | G06F 3/014 601/40 |
| 9,545,356 | B2 * | 1/2017 | Heaton | A61H 1/0288 |
| 10,912,701 | B2 * | 2/2021 | Wijesundara | F15B 18/00 |
| 11,698,683 | B1 * | 7/2023 | Kim | G06F 3/023 345/173 |
| 2011/0118635 | A1 * | 5/2011 | Yamamoto | A61H 1/0262 601/5 |
| 2012/0182135 | A1 * | 7/2012 | Kusuura | G06F 3/016 340/407.1 |
| 2017/0119614 | A1 * | 5/2017 | Yeow | A61H 1/0288 |
| 2017/0300115 | A1 * | 10/2017 | Kerr | G06F 3/016 |
| 2018/0303698 | A1 * | 10/2018 | Wijesundara | F15B 15/10 |
| 2021/0096649 | A1 * | 4/2021 | Mok | G06F 3/016 |

OTHER PUBLICATIONS

International Search Report for PCT/IB2021/054044 dated Sep. 6, 2021, 3 pages.
Written Opinion of the ISA for PCT/IB2021/054044 dated Sep. 6, 2021, 7 pages.

* cited by examiner

FIG. 1D                    FIG. 1E                    FIG. 1F

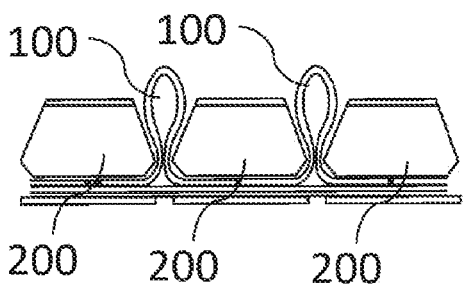
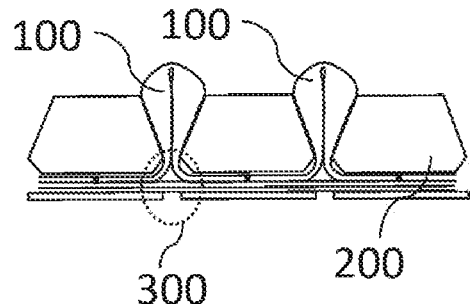
FIG. 2B
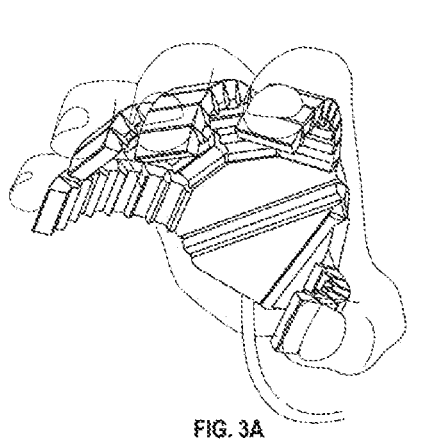
FIG. 3A
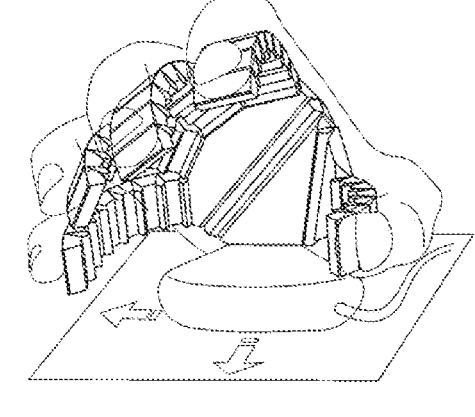
FIG. 3B
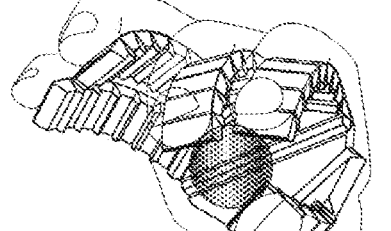
FIG. 3C
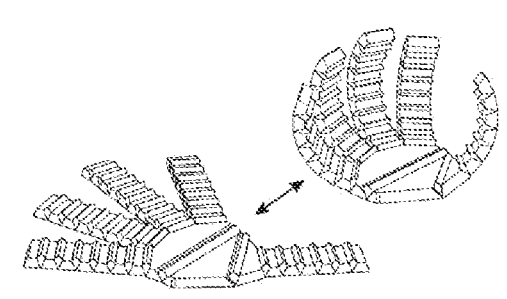
FIG. 3D

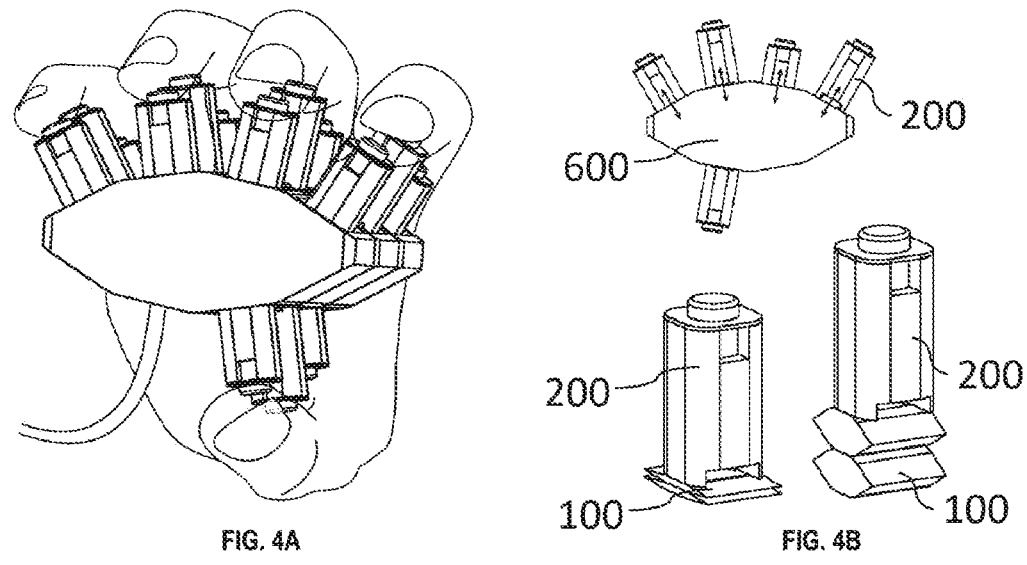
FIG. 4A                    FIG. 4B
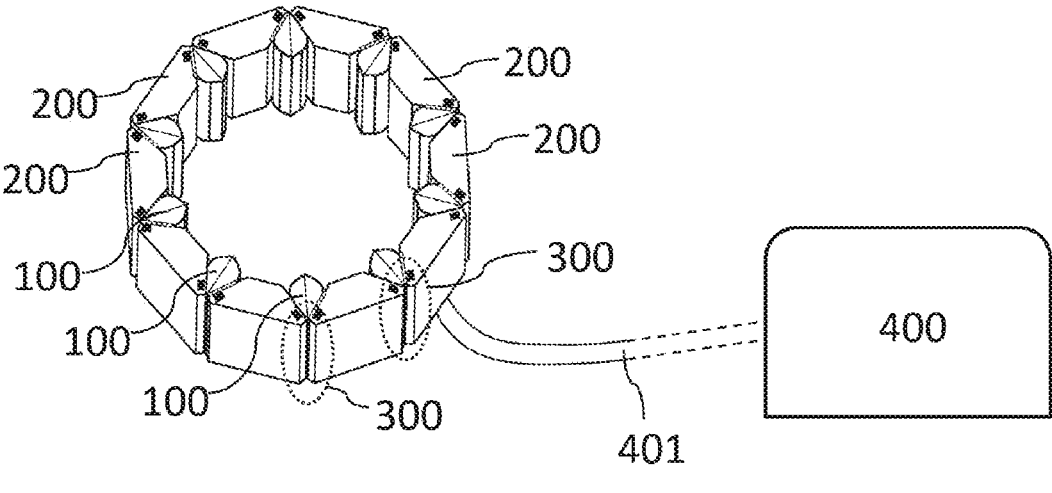
FIG. 5

FLUID-ACTUATED HAPTIC DEVICE AND METHODS FOR USING THEREOF

CROSS-REFERENCE TO RELATED APPLICATIONS

This application is the U.S. national phase of International Application No. PCT/IB2021/054044 filed May 12, 2021 which designated the U.S. and claims priority to International Application No. PCT/IB2020/056074 filed Jun. 26, 2020, the entire contents of each of which are hereby incorporated by reference.

TECHNICAL FIELD

The present invention belongs to the field of haptics, and it relates to a reconfigurable input and output haptic device, as well as its uses in various fields such as rehabilitation and/or virtual and augmented reality, which could be described as far as "tangible" reality.

BACKGROUND ART

As much as the computers, smart phones and other consumer electronics that shaped our lifestyle in the last few decades, interactive and assistive consumer robots are to enter our daily activities and redefine our future. Traditionally, robots have proven to be more precise, faster and stronger than human beings in performing repetitive tasks, behind enclosed assembly lines. Bringing robots into daily use implies that an intimate physical interaction is inevitable. Hand grasp together with sense of touch is a powerful yet complex and intricate ability that define the way people interact with things. When it comes to interaction with the environment with various objects and movements, we not only need to understand the object and the spatial conformity of the hand, but also the interaction forces between the object and the hand surface in contact (fingers and palm). Therefore, even though exactly the same shape of object and environments maybe given, the interactions, thus the experience of the person, could always change depending on the object's material property. That is why handling a soft piece of cake is not an easy task as the popular idiom suggests. If this is intricate and challenging enough in reality, handling it in virtual environments to reproduce seamless haptic interaction with virtual objects remains a challenge.

An ideal haptic device should be unnoticeable to the user, being virtually and mechanically transparent, to ensure coherent interaction between the real and virtual or augmented worlds in terms of forces and motion, as well as being able to fully represent physical attributes of virtual domain such as shape, rigidity, size, and mass among others. It should also be highly intuitive to use, compliant with grasp biomechanics and safe. Creating these features in haptic interfaces pose considerable challenges to their design and manufacturing.

Robotic systems can reproduce wide range of forces and motions suitable for haptic applications. Conventional robot designs characterize machines made of rigid links, joints, transmission elements, actuators, sensors and electronic hardware components; all run synergistically by control logic. Links and joints make up the linkages and their class, configuration and population decide the degrees of freedom (DoF) of the system. A classical joint combines at least two kinematic pairs, such as pin-hole, ball-socket, slider-slot among others that enable relative motion of one link with respect to another. Human hand with five fingers, excluding the wrist, measures at few decimeters, has 21 DoF and generates forces of 0-700 N depending on grasp type. Hence, it requires an increased number of high torque motors, transmission gears and joints yet integrated compactly to comply with hand kinematics, geometry and forces. Downsizing the conventional DC motors for producing high torques is unfeasible without using bulky transmissions such as gear trains, whereas compact actuator alternatives are not available of-the-shelf. In addition, high number of components would not only increase the robot size and mass, but also hinder its mass manufacturing and assembly cost. These are the fundamental challenges of robotic mechanism design for mesoscale haptic applications. Recent research on haptic interfaces overcomes this by reducing DoF or introducing vibrational actuation for texture information, which lack the true transparency of forces, representation and intuitiveness.

Researchers presented various haptic hardware interfaces to recreate kinaesthetic (force feedback) sensation in hand muscles, tendons and joints and cutaneous (tactile feedback) sensation on skin via shear, pressure and vibration. They can be categorizes into body-grounded and desktop-grounded devices. Body-grounded haptic devices reside on hand, allowing its free mobility and portability. Examples are the wearable gloves that cover the hand and fingertip, wearable mechanisms or hand-held finger-operated joysticks. Desktop-grounded devices are the robotic haptic manipulators with graspable or wearable end-effectors and reconfigurable tangible surfaces that recreate various shape forms by individual movements of several physical pixel elements, arranged in lattice. For these devices, the accuracy and precision of the feedback depends on the grounding: as soon as a desk is unstable, or gloves come looser or tighter, and/or in a different place, the feedback changes.

Wearable gloves and exoskeletons provide tactile sensation by embedding vibrational actuators on the finger and palm contact surface or force sensation by servomotors and transmission linkages, located on the back of the palm or wrist. Despite the minimal number of actuators, typical haptic gloves are bulky and heavy for reasons of using multiple kinematic linkages. They provide limited force feedback on fingertips due to lack of controllable extra DoF on the rest of the phalanges. Gloves also neglect intricate skin interaction forces, including skin deformations and friction, which further limits haptic sensation. Besides the size compatibility, breathability and washing issues, gloves create additional hurdles of wearing, fastening and strapping.

Unlike haptic gloves, fingertip wearable and finger-operated hand-held haptic devices gained more popularity owing to simplicity, ease of use and affordability. They can provide vibrotactile and skin deformation feedback at the fingertip or palm, and some allow large kinaesthetic multi-DoF movements at the fingertip. The main downfall of such interfaces is that they permit limited grasp modes (only precision grasp), and lack force feedback on the entire hand where there is no contact point with the device.

Haptic manipulators are non-wearable, finger or hand-operated desktop robots that primarily provide kinaesthetic feedback. Parallel or series manipulators have well defined kinematics with fixed coordinate frame and are highly accurate as the position information is obtained from motor encoders. As their limited DoF and motion range adapts to primarily arm and wrist movements, it compromises grasp, mobility and portability.

Tangible surfaces comprise typically (a) two-dimensional array(s) of actuator "pixels', in the form of rigid pins or deformable crusts, that recreate three-dimensional surfaces by out-of-plane movements of individual pixels. Tangible surfaces permit solely non-graspable tactile sensation. They also require high number of actuators to increase the resolution of 3D forms, which makes them impractical for hand-operated portable devices.

SUMMARY OF INVENTION

In order to address and overcome at least some of the above-mentioned drawbacks of the prior art solutions, the present inventors developed a fluid-actuated, input and output haptic device having improved features and capabilities.

The purpose of the present invention is therefore that of providing a haptic device that overcomes or at least reduces the above-summarized drawbacks affecting known solutions according to the prior art.

In particular, a first purpose of the present invention is that of providing a haptic device having a plurality of interaction modalities, including kinesthetic, tactile and graspable modalities at the same time.

A further purpose of the present invention is that of providing both tactile and force haptic feedback with a precise and powerful grasp type.

Still a further purpose of the present invention is that of providing a haptic device providing the above-listed feedbacks and sensations on the entire hand or another body part, in a shape changing, simple and ergonomic design.

Still a further purpose of the present invention is that of providing a haptic device allowing to receive user haptic input commands.

All those aims have been accomplished with the present invention, as described herein and in the appended claims.

The present inventors created robotic haptic interfaces, which adjust shape and stiffness to recreate controllable 3D forms and forces for immersive human-machine interaction, inter alia. They require no calibration for specific grounding location. In embodiments of the invention, the haptic device of the invention provides omnipresent force and tactile sensation on user fingers and palm by stimulating mechano-receptors of skin, tendons and even muscles while simultaneously offering in some embodiments input commands, performance and diagnostic data that are collected and generated by an embedded sensory networks and machine learning.

Among various applications, the present invention can help people recover mobility of upper extremities by making hand and neuro rehabilitation interactive, immersive, effective, and therefore progressive, particularly when coupled with the existing virtual reality (VR) and augmented reality (AR) software.

In view of the above-summarized drawbacks and/or problems of the prior art, according to the present invention there is provided a haptic device according to claim 1, a system comprising the haptic device according to claim 12 and a method for providing a haptic feedback to a user according to claim 15.

Further embodiments of the present invention are defined by the appended claims.

The above and other objects, features and advantages of the herein presented subject-matter will become more apparent from a study of the following description with reference to the attached figures showing some preferred aspects of said subject-matter.

BRIEF DESCRIPTION OF DRAWINGS

FIG. 1D shows a control command setting of the two-finger device embodiment; FIG. 1E shows a force feedback setting of the two-finger device embodiment; FIG. 1F shows a vibration feedback setting of the two-finger device embodiment FIG. 2B shows a longitudinal cross section of the same embodiment as depicted in FIG. 2A, showing an inflated and deflated actuator;

FIG. 3A shows a multifinger embodiment of the device of the invention with free 3D mobility of the hand of a user; FIG. 3B shows the same embodiment with a confined mobility in a 2D plane; FIG. 3C shows the same embodiment actuated to provide a touch illusion of 3D surfaces to a hand of a user; FIG. 3D shows the foldable design of the same embodiment, and its ability to switch between a quasi-2D configuration to a 3D configuration;

FIG. 4A shows another embodiment of the device of the invention for providing or receiving haptic feedbacks to/from a hand of a user, FIG. 4B shows the individual pins movement as well as the design of a single pin with a stacked inflated/deflated actuator;

FIG. 5 shows one embodiment of a system according to the invention.

DETAILED DESCRIPTION OF THE INVENTION

Figure 1A:
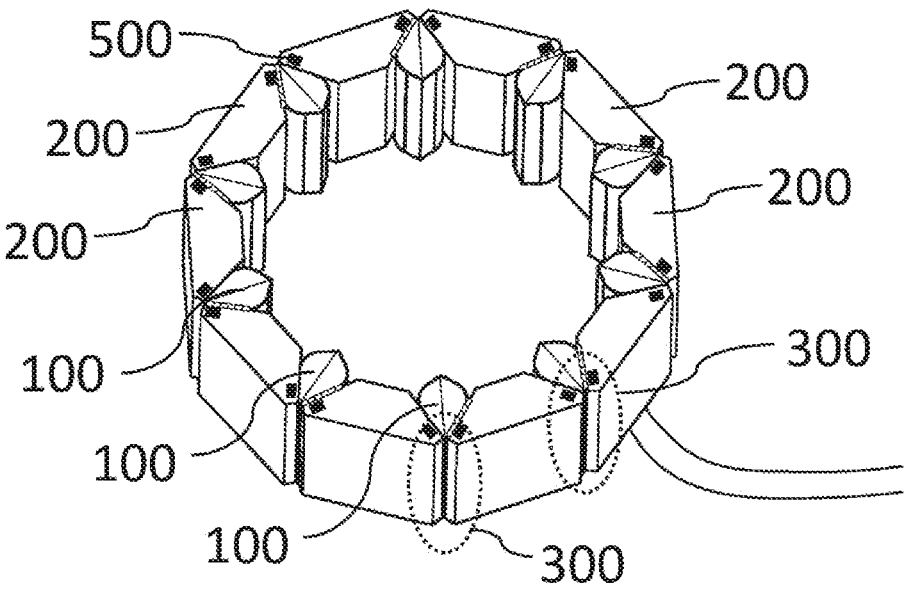
FIG. 1A shows an isometric view of one embodiment of the device of the invention designed as a "two fingers haptic device"

The subject-matter described in the following will be clarified by means of a description of those aspects which are depicted in the drawings. It is, however, to be understood that the scope of protection of the invention is not limited to those aspects described in the following and depicted in the drawings; to the contrary, the scope of protection of the invention is defined by the claims. Moreover, it is to be understood that the specific conditions or parameters described and/or shown in the following are not limiting of the scope of protection of the invention, and that the terminology used herein is for the purpose of describing particular aspects by way of example only and is not intended to be limiting.

Unless otherwise defined, technical and scientific terms used herein have the same meaning as commonly understood by one of ordinary skill in the art to which this invention belongs. Further, unless otherwise required by the context, singular terms shall include pluralities and plural terms shall include the singular. The methods and techniques of the present disclosure are generally performed according to conventional methods well known in the art and as described in various general and more specific references that are cited and discussed throughout the present specification unless otherwise indicated. Further, for the sake of clarity, the use of the term "about" is herein intended to encompass a variation of +/−10% of a given value.

Non-limiting aspects of the subject-matter of the present disclosure will be described by way of example with reference to the accompanying figures, which are schematic and are not intended to be drawn to scale. For purposes of clarity, not every component is labelled in every figure, nor is every component of each aspect of the invention shown where illustration is not necessary to allow those of ordinary skill in the art to understand the invention.

The following description will be better understood by means of the following definitions.

As used in the following and in the appended claims, the singular forms "a", "an" and "the" include plural referents unless the context clearly dictates otherwise. Also, the use of "or" means "and/or" unless stated otherwise. Similarly, "comprise", "comprises", "comprising", "include", "includes" and "including" are interchangeable and not intended to be limiting. It is to be further understood that where for the description of various embodiments use is made of the term "comprising", those skilled in the art will understand that in some specific instances, an embodiment can be alternatively described using language "consisting essentially of" or "consisting of."

In the frame of the present disclosure, the expression "operatively connected" and similar reflects a functional relationship between the several components of the device or a system among them, that is, the term means that the components are correlated in a way to perform a designated function. The "designated function" can change depending on the different components involved in the connection. Likewise, any two components capable of being associated can also be viewed as being "operatively couplable," to each other to achieve the desired functionality. Specific examples of operatively couplable items include but are not limited to physically mateable and/or physically interacting components and/or wirelessly interactable and/or wirelessly interacting components and/or logically interacting and/or logically interactable components. A person skilled in the art would easily understand and figure out what are the designated functions of each and every component of the device or the system of the invention, as well as their correlations, on the basis of the present disclosure.

As used in the present disclosure, "haptic technology" or "haptics" is a feedback technology which recreates or stimulates the sense of touch (mechanoreceptors) by applying forces (normal and shear), pressures, vibrations temperature change and/or motions, to a user. This mechanical stimulation can be used for instance to assist in the creation of virtual objects in a computer simulation, to control such virtual objects, and to enhance the remote control of machines and devices (telerobotics). A "haptic device" is a device that exploits haptic technology. Haptic devices may incorporate sensors that measure forces, pressures, position, strain, or movements exerted by the user on an interface and vice versa. Haptic technology has made it possible to investigate how the human sense of touch works by allowing the creation of carefully controlled haptic virtual objects. These objects are used to systematically probe human haptic capabilities, which would otherwise be difficult to achieve. The most common applications of the haptic technology include the provision of haptic feedbacks for controllers such as game controllers, joysticks, remote-controlled robotic tools, mobile devices such as mobile phones, virtual reality systems and so forth. Haptic interfaces for medical simulation may prove especially useful for e.g. training in minimally invasive procedures, as well as for performing remote surgery or rehabilitation.

The human sense of touch can be divided into two separate channels. Kinaesthetic perception refers to the sensations of positions, velocities, forces and constraints that arise from the muscles and tendons. Kinaesthetic feedback is based on larger scale forces transmitted through the joints and muscles which inform us of relative limb and finger positions through the sense of proprioception. Force-feedback devices appeal to the kinaesthetic senses by presenting computer-controlled forces to create the illusion of contact with surfaces of various rigidity. Cutaneous stimuli are felt by the pressure receptors in the skin, typically in the fingertips, phalanges and palm, providing information on texture, shape, and force direction during object manipulation. The cutaneous class of sensations arise through direct contact with the skin surface. Cutaneous stimulation can be further separated into the sensations of pressure, stretch, vibration, and temperature. Tactile devices generally appeal to the cutaneous senses by skin indentation, vibration, stretch and/or electrical stimulation. The device of the present invention is construed and assembled in order to provide a tactile feedback involving both kinaesthetic and cutaneous sensations. In this context, the device and system according to the present invention are referred to as "multimodal" device or system, this term highlighting the several modes by which the haptic device can provide tactile feedbacks to a user, typically combining kinaesthetic and cutaneous sensations, including temperature feedback.

Multimodal devices can offer a flexible, efficient and usable way to allow users to interact through input modalities and to receive information by the device through output modalities. A multimodal device has to recognize the inputs from the different modalities, combining them according to temporal and contextual constraints in order to allow their interpretation, interpreting the fused inputs and returning to the user outputs arranged according to a consistent feedback.

A "closed-loop system", also known as a feedback controlled system, refers herein to a control system which uses the concept of an open loop system (in which the output has no influence or effect on the control action of the input signal) as its forward path but has one or more feedback loops (hence its name) or paths between its output and its input. The reference to "feedback" means that some portion of the output is returned back to the input to form part of the system's excitation. Closed-loop systems are usually designed to automatically achieve and maintain the desired output condition by comparing it with the actual condition. It does this by generating an "error" signal which is the difference between the output and the reference input. In other words, a closed-loop system is a fully automatic control system in which its control action is dependent on the output in some way.

As used herein, a "fluid" is a substance that continually deforms (flows) under an applied shear stress. Fluids are a subset of the phases of matter and include liquids, gases, plasmas and plastic solids. They display properties such as not resisting deformation, or resisting it only lightly and the ability to flow (also described as the ability to take on the shape of the container). In embodiments of the invention, the fluid comprises or consists of a gas such as air or a liquid such as e.g. water, aqueous solutions, non-polar (e.g. oil) solutions, melted thermoplastics and the like.

The haptic device comprises one or more sensors for detecting and possibly storing at least a user's physiological parameter, an environmental parameter or a combination thereof, and is operatively connected with at least one element of the haptic device. A "sensor" as used herein is a device that detects (and possibly responds to) signals, stimuli or changes in quantitative and/or qualitative features of a given system, or the environment in general, and provides a corresponding output. The output is generally a signal that is converted to human-readable display at the sensor location or transmitted electronically over a network for reading or further processing. The specific input could be for instance light, heat, motion, trajectory, moisture, pressure, or any one of a great number of other environmental and/or physical phenomena. According to the invention, a sensor preferably comprises means for detecting and possibly storing user's physiological or physical parameter, an environmental parameter or a combination thereof. The sensor can therefore comprise a data storage device to hold information, process information, or both. Common used data storage devices include memory cards, disk drives, ROM cartridges, volatile and non-volatile RAMs, optical discs, hard disk drives, flash memories and the like. The information detected and collected by sensors can relate to a user's physiological or physical parameter such as for instance muscle contraction (including postural muscle contraction), heart work rate, skin conductance (also called galvanic skin response GSR), body temperature, blood pressure, sweating, hand or another body part position and so forth. Alternatively or additionally, the information detected and collected by the sensor can relate to environmental parameters such as temperature, humidity, light, sounds and the like.

Preferably, sensors further comprise means for transmitting the detected and possibly stored data concerning the above-mentioned parameters to a computer, and more preferably through a wireless connection. "Wireless" refers herein to the transfer of information signals between two or more devices that are not connected by an electrical conductor, that is, without using wires. Some common means of wirelessly transferring signals includes, without limitations, WiFi, Bluetooth, magnetic, radio, telemetric, infrared, optical, ultrasonic connection and the like.

For "computer-readable data carrier" or "computer-readable medium" is herein meant any available medium that can be accessed by a processor and may include both a volatile and non-volatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

The expression "Virtual Reality" (VR) refers to an experience taking place within a simulated, artificial environment constructed by a computer, that incorporates mainly auditory and visual, but also other types of sensory feedback like haptic, and permits a user to interact with that environment as if the user were actually immersed in the environment. The aim of a "virtual reality system" is to give users the ability to explore environments that exist only as models in the memory of a computer. This immersive environment can be similar to, or models of, the real world or it can be fantastical, creating an experience that is not possible in ordinary physical reality.

Current VR technology most commonly uses VR headsets or multi-projected environments, sometimes in combination with physical environments or props, to generate realistic images, sounds and other sensations that simulate a user's physical presence in a virtual or imaginary environment. A person using virtual reality equipment is able to "look around" the artificial world, move around in it, and interact with virtual features or items. The effect is commonly created by VR headsets consisting of a head-mounted display with a small screen in front of the eyes, but can also be created through specially designed rooms with multiple large screens.

A typical VR system consists of a computer, input devices, and an output device. The computer maintains the model of the virtual world and calculates its appearance from the view point of the user. The output device is often an apparatus that mounts on the user's head and may be either a display or screen mounted to a helmet or a pair of goggles. By wearing the helmet, the user visually immerses himself or herself in the virtual world. Also, attached to the helmet are tracking devices that enable the computer to know about the position of the user's head and in what direction the user is looking. The input devices found on a typical system range from simple joysticks to gloves or other body wear that may monitor a user's movements and gestures.

Augmented reality systems may be considered a form of VR that layers virtual information over a live camera feed into a headset or through a smartphone or tablet device giving the user the ability to view three-dimensional images. "Augmented Reality" (AR), also known as "mixed reality", is an interactive experience of a real-world environment whereby the objects that reside in the real-world are "augmented" by computer-generated perceptual information, sometimes across multiple sensory modalities, including visual, auditory, haptic, somatosensory, and olfactory. The overlaid sensory information can be constructive (i.e. additive to the natural environment) or destructive (i.e. masking of the natural environment) and is seamlessly interwoven with the physical world such that it is perceived as an immersive aspect of the real environment. In this way, augmented reality alters one's ongoing perception of a real world environment, whereas virtual reality completely replaces the user's real world environment with a simulated one.

A "compliant electrode" is any structure or element able to deliver an electric current, and adapted to change its shape according to the shape change of the support it adheres to without substantially compromising mechanical or electrical performance. Examples of compliant electrodes known in the art include metal thin-films (including patterned electrodes, out-of-plane buckled electrodes, and corrugated membranes), metal-polymer nano-composites, carbon powder, carbon grease, conductive rubbers or conductive paints, a review of which is provided in Rosset and Shea (Applied Physics A, February 2013, Volume 110, Issue 2, 281-307), incorporated herein in its entirety by reference. As it will be apparent to those skilled in the art, built-in multilayers or stacks of several layers of polymeric, composite, metallic and/or oxide materials, as well as combinations thereof, are encompassed in the definition of compliant electrode.

With reference to FIGS. 1 to 4, according to a main aspect of the invention, it is provided a haptic device comprising:
- at least one fluidic actuator 100 operatively connectable with pumping means; and
- a plurality of movable members 200 mechanically connected with said at least one fluidic actuator 100
  wherein said movable members 200 can
    perform a displacement upon actuation of the fluidic actuator 100 and/or
    resist the movements of a body part of a user upon actuation of the fluidic actuator 100
  to provide a tactile and/or force haptic sensation to a body part of a user.

In one embodiment, the device permits the movements of a user's body part, with or without actuation of the fluidic actuator 100, to receive tactile and/or force haptic inputs from said body part.

Figure 1B:
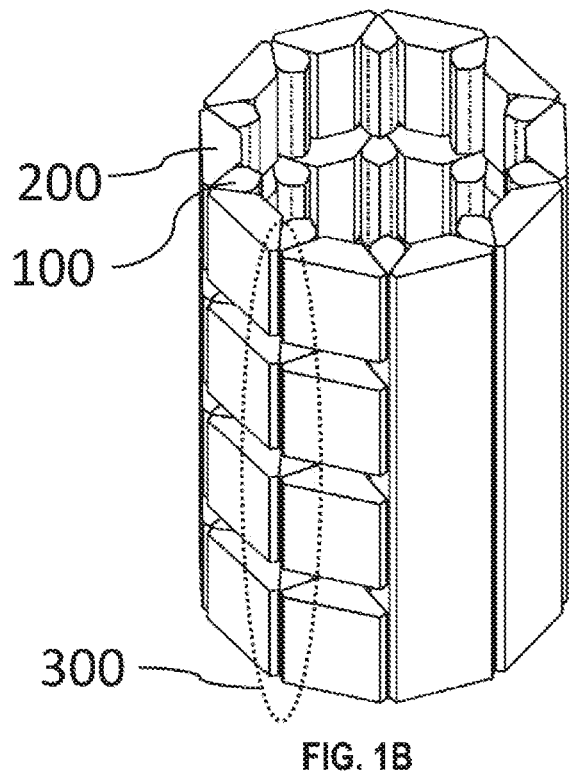
FIG. 1B shows an isometric view of one embodiment of the device of the invention designed as a "multi-finger haptic device", including a thumb section and a four-finger section.

An exemplary, non-limiting embodiment of a device according to the present invention is depicted in FIG. 1. In the shown embodiment, the body part of a user in contact with the device of the invention is the hand, including the palm and at least two fingers. As shown, the device is a non-wearable, graspable structure comprising a plurality of members 200 mechanically interconnected between them. In the shown embodiment, said movable members 200 are mechanically interconnected via joints 300 in such a way to be linked as in a chain. The embodiment depicted in FIG. 1A represents a possible two-finger, hand-held device and the embodiment shown in FIG. 1B represents its extension to a five-finger configuration with four digits and thumb contact surfaces. The joints 300 and accordingly the movable members 200 are configured to accommodate at least part of a fluidic actuator 100 or an inflatable portion thereof. In at least this first embodiment, at least some of the movable members 200 form a kinematic chain in which the displacement performed is a relative movement of said movable members 200 one to another.

Figure 1C:
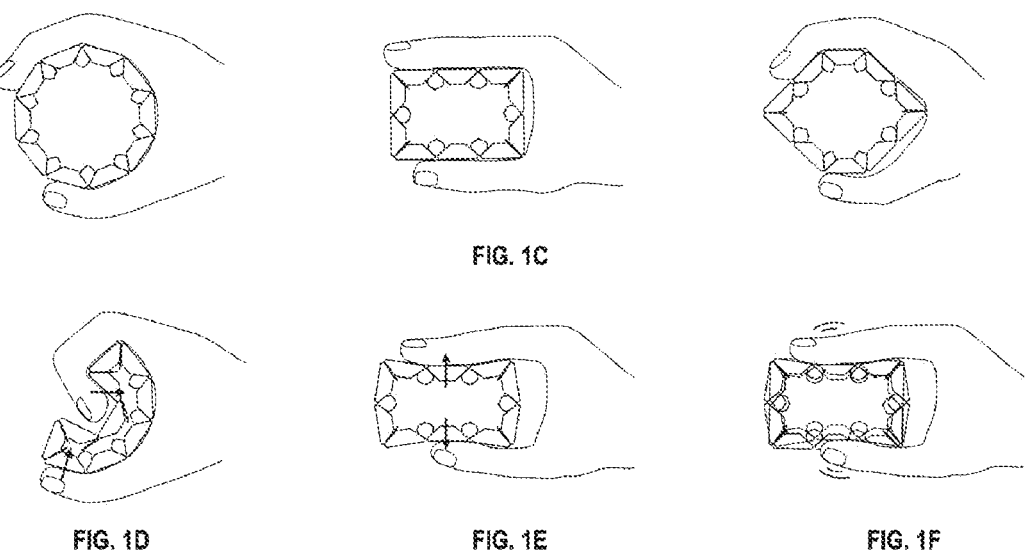
FIG. 1C shows three lateral views of the two-finger device embodiment including circle, rectangle and hexagon.

The device, when actuated at desired locations via at least one fluidic actuator 100 operatively connectable with pumping means, self-folds to induce a large variety of shapes, such as a circle, rectangle, oval, pentagon and virtually any other arbitrary shapes as depicted in FIG. 1C. When manipulated, the device receives user control commands by sensing, such as the finger positions and forces as depicted in FIG. 1D. When squeezed, it can recreate adjustable stiffness gradients, depending on the needs and on the rigidity of virtual/augmented objects from soft to rigid as in FIG. 1E. The device can also provide a vibrotactile feedback as shown in FIG. 1F when all actuators 100 or inflatable portions thereof are inflated periodically at the same time or in sequence. The device is dynamically reconfigurable and adjustable in terms of shape and stiffness, thus recreating haptic sensation for human-computer, human-robot and human-human interaction via e.g. digital, virtual, augmented and mixed reality. Advantageously, the interface fits into a human hand providing force and tactile sensations by acting on both the palm and fingers.

In embodiments of the invention, the haptic device may comprise a plurality of fluidic actuators 100 configured to provide, upon actuation, a displacement of more than one movable members 200. This configuration has been implemented into a two-finger prototype in FIG. 1A manufactured based on a robotic origami design methodology, also known as layer-by-layer manufacturing of quasi 2D components, and embeddable, distributed fluidic actuator networks, addressing the challenges of robotic haptic interfaces previously described. It has a continuously folding design with plurality of relatively rigid links connected with fluidic actuators at the joints 300 as in FIG. 2A. Selective inflation of the individual actuators 100 via flexible fluidic circuits 101 produces various shapes and input fluidic pressure is varied to adjust the stiffness of the structure.

Figure 2A:
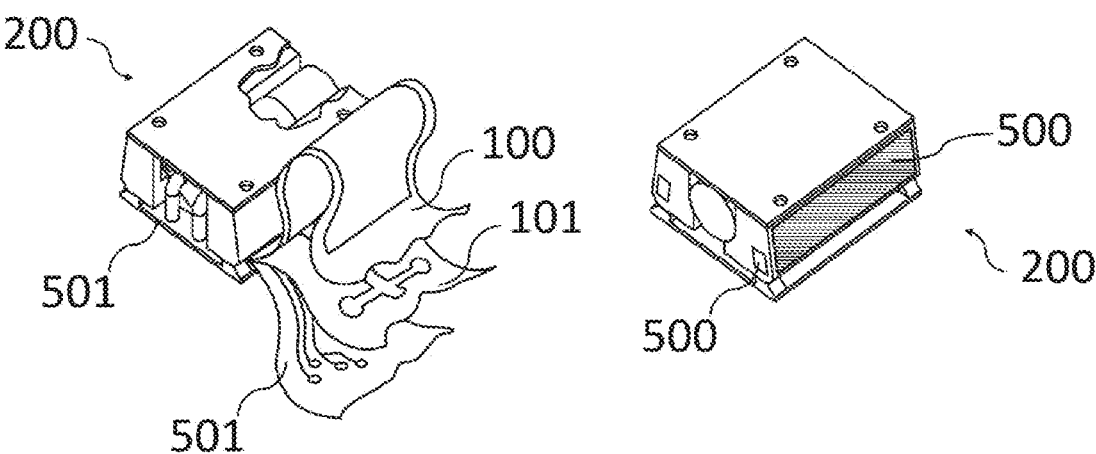
FIG. 2A shows a cut, front view (left) and an isometric back view (right) of a portion of the device of the invention in which the embedded components are depicted.

The device can be designed and fabricated by combining multiple layers of diverse materials to embed different functionality and mechanisms, such as rigid/semi-rigid/soft tiles, inflatable actuators and flexure joints as depicted in FIG. 2A. The fluidic actuators 100 can be heat-sealed and cut from a single piece of e.g. thermoplastic material backed for instance by fabric, so to create a plurality of inflatable portions (non-sealed air pockets) in one single actuator 100 configured to provide, upon actuation, a displacement of more than one movable member 200: the inflatable portions are embedded into the structure by folding to form pads of two air pockets, each pad possessing an individual fluid inlet as shown in FIG. 2B. A fluid input is controllable by programming an array of embedded or external valves with desired pressure and flow as illustrated in FIG. 2A.

Since shapes producible and graspable by human hand are limited to finger kinematics, extra DoFs of the device can be simplified by decoupling motions into independent kinematic chains on the fingers as depicted in FIG. 1B. This ensures continuous contact of the device with each finger and simplifies the design.

Another example of a multi-finger device configuration for free operation in 3D space and for confined operation on 2D plane, similar to a computer mouse, is depicted in FIGS. 3A and 3B, respectively. The DoF is distributed among five fingers via open chains to allow independent finger motions. The device moves freely in six DoF without actuation and stimulates force feedback on the fingers and palm when actuated by creating touch illusions of various 3D surfaces of variable shape, size and stiffness as shown in FIG. 3C. The device may comprise multiple layers of tactile sensors 500 and actuators, electronic and fluidic channels assembled compactly into a quasi-2D foldable structure as shown in FIG. 3D, and can fold to fit into the hand.

In a second implementation, the haptic device of the invention further comprises a housing 600 for hosting the fluidic actuator(s) 100 as in FIG. 4A. In this configuration, a hand held device comprises multiple pins, representing the movable members 200, protruding out of a rigid or deformable housing 600 interacting with fingers and the palm of a hand, and producing opposing forces to fingers with adjustable force, motion and frequency output for force and tactile feedback. The pins 200 can be actuated individually by fluidic actuators 100 stacked underneath as illustrated in FIG. 4C and exert forces to fingers and palm perpendicularly to finger phalanges. The device offers user inputs by pushing the pins 200 and collecting grasp data with sensors 500.

The haptic interfaces of the invention here can adjust shape and stiffness to recreate arbitrary 3D forms and forces for human-robot and human-computer interaction. The interfaces can fit into a human hand and provide omnipresent force and tactile sensation on all fingers and palm in those embodiments where the hand is body part of interest. The devices are flexible, conform to body (e.g. hand) biomechanics, and therefore enable an intuitive and safe haptic interaction comparable with wearing. Unlike gloves, the devices enable direct physical contact with user hand by stimulating finger muscles, tendons and skin, providing realistic connection between the virtual and real world when the device is used in a VR setting. The multi-DoF and controllable devices establish a seamless two-way link by true representation of what is simulated and emulated.

Preferably, the actuators 100 are composed of soft materials that can deform upon inflation thereof of a fluid, such as a pressurized fluid like air, to trigger the movement of one or more movable member(s) 200. In the frame of the present disclosure, a "soft" material is any material that is either compressible, reversibly compressible, elastic, stretchable or any combination thereof. A soft material such as an elastic material is particularly suitable for the manufacturing at least portions of the device of the invention, since it could permit, enhance or ameliorate the range of possible user's feedbacks provided by the device in terms of tactile and force sensations. The term "stretchable" is herein used to mean an intrinsic or engineered property of a material or structure that allows such material or structure to perform a large elongation upon a strain stress, typically of >5% of the elongation of a soft structure at rest, such as for instance more than about 10%, more than about 20%, more than about 50%, more than about 100% or even more than about 200% of a soft structure at rest, in an elastic behaviour regime and without or with negligible impairment of the mechanical and/or functional performances of the said material or structure along a single or multiple strain stress cycles.

In embodiments of the invention, therefore, the actuators 100 are soft actuators substantially made of a soft polymeric material and their composites, possibly backed by a flexible non-stretchable material, such as fabric. Exemplary soft polymeric materials can be selected from a non-exhaustive and non-limiting list comprising thermosets or thermoplastics such as thermoplastic polyurethane (TPU), styrene butadiene styrene (SBS) or styrene ethylene butylene styrene (SEBS), Nylon, Polyether block amide (PeBax) polyamide, Polyvinyl alcohol (PVA), polyimide, poly ethylene (PE), poly propylene (PP), polyether etherketone (PEEK), Acrylonitrile butadiene styrene (ABS), epoxys, polytetrafluoroethylene (PTFE); soft foams such as polyurethanes including reticulated polyurethanes; flexible polyvinyl chloride (PVC), neoprene, uncrosslinked neoprene, cross-linked polyethylene, polyether, ethylene-vinyl acetate (EVA), polyethylene-vinyl acetate (PEVA), polypropylene glycol (PPG), latex; elastomeric materials such as silicone rubber (e.g. polydimethylsiloxane PDMS) or fluorosilicone rubber; thermoplastic elastomers such as styrenic block copolymer (SBC), ethylene propylene diene monomer (EDPM) rubber, butyl rubber, nitrile rubber or any combination of the foregoing. In embodiments of the invention, the movable members 200 can be composed or substantially composed of the same soft material(s) of the actuators 100 as listed above, or coated with said soft material(s) to provide tactile clues to a user.

In preferred embodiments of the invention, the haptic device may comprise at least one sensor 500 and/or miniaturized device located on at least one of the fluidic actuator(s) 100 and a movable member 200 as in FIG. 1A and FIG. 2A. The movable members 200 (with or without any coating) and/or the actuators 100 can embed one or more sensors 500 and/or miniaturized devices for diverse use, including for instance compliant electrodes or electrode arrays for sensing, monitoring and/or stimulating a physiological parameter/a physiological response in a body part, such as a hand, of a user. As a way of example, sensors or devices 500 according to the invention may comprise a motion sensor, a velocity sensor, a touch sensor, a proximity sensor, a temperature sensor, a light sensor, a force/torque sensor, fluid pressure sensor, a humidity sensor, an optical device or light device such as LEDs, an accelerometer or a gravity sensor to cite a few, as well as combinations thereof. The haptic device may also comprise heating and cooling elements, such as resistive circuits or Peltier elements for stimulating various surface temperatures. The device may also incorporate elements for electrical or magnetic stimulation of a body part of a user. All the sensors or devices 500, as well as the electronic components for their functioning including PCBs 501, flexible electronic circuits 501, proportional and/or on-off fluidic valves, power supply components such as wiring, embedded batteries and the like, may be integrated directly into the device, and particularly on or within the rigid members 200, as shown in FIG. 2A.

In some embodiments the device can be somehow fixed to a body part of interest of the user, such as the back of a hand and/or a wrist for instance by means of adjustable fabric bands or the like having side-release buckles, hooks-and-loops rings or soft elastic threads and bands, to cite a few examples. As it will be apparent to a person skilled in the art, the main aim and inventive concept of the device and system according to the invention will not be affected by these optional configurations.

The device of the invention can be designed, adapted and configured to interact with body parts of a user in a plethora of different situations and applications. As a way of example, the haptic device can be conceived and fabricated as a haptic arm rest, a car seat, an interactive panel, a bed, a matte and the like, without departing from the general inventive concept. The device can be portable by holding and/or embracing it with a body part of the interest of the user, and/or fixing it to a body part of the user and/or movable and/or transportable external environment, allowing free movement of the body part and/or body of the user in any six-DoF of the three-dimensional space. The device of the invention can also be used in non-portable configurations by fixing the device to a stationary and/or dynamic external environment, allowing free movement of the body part and/or body of the user in any six-DoF of the three-dimensional space.

As it will be apparent, another object of the present invention relates to a system comprising the haptic device according to the invention operatively connected with pumping means 400, exemplarily depicted in FIG. 5. Preferably, the system further comprises a computer device operatively connected with said pumping means and/or said device, said computer device comprising instructions to activate said pumping means to operate the fluidic actuator(s) 100. The data processing apparatus of the invention can be any suitable device such as computers, smartphones, tablets, voice-activated devices (i.e. smart speakers/voice assistants) and the like.

The actuator(s) 100 can be operatively (fluidically) connected through a proximal end inlet via a fluidic connection element 401 to suitable pumping means 400 such as a syringe, a fluidic pump (e.g. mechanical pumps or micropumps, peristaltic pumps) and the like. In this configuration, the system works as an open-loop system, wherein the computer device actuates the pumping means 400 based on outputs provided by the computer itself, without any backinfluence from the device. In another embodiment of the invention, the system bidirectionally interacts with a user based on parameters sensed by sensors 500 located on the device. Contrary to the previous embodiment, the system in this arrangement operates in a closed-loop configuration, i.e. the device of the invention is operated based on the feedback received by sensors 500.

In operation, the system is adapted and configured to perform a method for providing a haptic feedback to a user, which represents an additional object of the present invention, said method comprising the steps of:

providing a system according to the present disclosure;
    allowing the user to contact the haptic device with a body part; and
    activating the pumping means 400 to operate the fluidic actuator(s) 100, thereby providing a displacement of said movable members 200 and/or a resistance to the movements of the body part of the user, and therefore a tactile and/or force haptic sensation to the user.

In one embodiment, the method further comprises a step of permitting the movements of the body part of the user, and therefore receiving tactile and/or force haptic inputs from the body part of the user. In one embodiment, said body part of the user is a hand.

In some embodiments, the method foresees that the step of activating pumping means 400 comprises varying a fluid flow within the fluidic actuator(s) 100 over time, thereby providing a dynamic displacement of said movable members 200 and therefore a dynamic haptic sensation to the body part of the user.

In some embodiments, the method foresees that the step of activating pumping means 400 comprises varying a fluid pressure within the fluidic actuator(s) 100 over time, thereby providing a resistance with said movable members 200 and therefore a haptic sensation to the body part of the user.

The method can be implemented to fix a fluid flow within the fluidic actuator(s) 100 to keep a predetermined haptic sensation on the body part of a user provided by the haptic device. "Fixing a fluid flow within the fluidic actuator(s) to keep a predetermined haptic sensation" can comprise fixing a fluid flow to fix a certain arrangement of the actuator(s) 100 and movable members 200 to e.g. provide a fixed shape, but can also comprise varying a fluid flow to keep a predetermined dynamic haptic sensation on the body part of a user, e.g. continuous vibration or predetermined motion.

The method of the invention is particularly suitable to actuate the device and system according to the invention in scenarios envisaging the use of Virtual Reality (VR) for diverse applications, including recreational VR or VR-implemented rehabilitation therapies. As a way of example, hand therapy could enjoy of the device, system and methods according to the present invention, in both classical and VR-implemented settings.

Recently, virtual reality settings have been introduced in neuro rehabilitation therapies. Existing commercial VR/AR controllers allow non-wearable, hand-held experience for interacting with virtual environments at affordable price. They, however, do not provide force feedback on the entire hand and do not allow free movement of all fingers. Joystick type controllers can at best involve two fingers with limited tactile sensation.

The device of the present invention can provide both force and tactile sensation for immersive video gaming experience be it grasping, controlling or manipulating virtual objects, and can directly be integrated together with the existing vision-based virtual environments for both hand and neuro rehabilitation. The device can provide force and tactile stimulation for restoring muscular, perceptual and fine motor functions, such as finger movements, hand strength, haptic sensation, dexterity, coordination and muscle activity.

One non-limiting, exemplary application is for hand therapy, an occupational or physical rehabilitation exercise for people with limited joint mobility and other hand functional disorders caused by illnesses, injuries and stroke. Today, skilled specialists perform exercises manually with supplemental use of passive squeezable rubber balls, finger-extenders and finger weights. The approach is purely empirical with no quantifiable metrics on performance and progress of the patients. It requires intensive, focused and task-oriented trainings, repeated hundreds to thousands of hours, for the brain to rewire lost function thanks to neuroplasticity. The subsequent need for rehabilitation is also unmet.

The device, system and methods according to the present invention enable quantitative and data-driven approach for hand and neuro rehabilitation. The multifunctional device and system can provide repetitive force and tactile stimulation for restoring muscular, perceptual and fine motor functions of patients with stroke and injuries, also by means of VR gaming. Distributed actuators and sensors embedded into the device can measure and model patient grasp and set personalized, concentrated and adaptable therapeutic training programs employing machine learning algorithms. Powered by reward-based VR games, the system of the invention enables patients to experience immersive, interactive and entertaining training ("entertraining") therapy. This could encourage patients and expedite their recovery. The compliance and portability of the device allows to employ it safely outside hospitals, including homes to encourage patients to help themselves.

According to the embodiments as just described, the system can additionally include means for displaying a virtual scene or object to a user in an all-in-one setting; said means can be for instance goggles, virtual reality headsets, virtual reality displays or digital displays in general.

As used herein, a "virtual reality display" or "VR display" is a display device adapted to provide a virtual reality image or video. Usually, a VR display has a high resolution (e.g. 1280×800 and above) and the ability to show stereoscopic imagery, and typically has one or two small display units such as cathode ray tubes (CRT), liquid crystal displays (LCDs), liquid crystal on silicon (LCos), or organic light-emitting diodes (OLED) displays. Multiple micro-displays can be used to increase total resolution and field of view. The entire system can comprise further elements adapted to provide e.g. a more realistic, intense and/or immersive VR experience, such as for instance means for eye tracking to measure the point of gaze, allowing a computer device to sense where the user is looking.

The device, when actuated selectively, stiffens at desired locations to induce shapes when squeezed by the user, for instance, spherical, cylindrical, rectangular and arbitrary shapes. The stiffness gradient can be varied depending on the rigidity of virtual objects.

In order to organically operate the entire multimodal VR system, the computer device is adapted and configured to further control also the VR scene provided to the user in parallel with the pumping means. This allows to seamlessly furnish to a user a fully immersive, real-time multimodal sensation and feedback.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A haptic device comprising:
at least one fluidic actuator operatively connectable with pumping means; and
a plurality of movable members mechanically connected with said at least one fluidic actuator
wherein the at least one fluidic actuator is heat-sealed and cut from a single piece of thermoplastic material, the single piece of thermoplastic material forming a plurality of inflatable portions in the at least one fluidic actuator, wherein each inflatable portion of the plurality of inflatable portions is embedded between a pair of movable members of the plurality of moveable members;
wherein said movable members can
perform a displacement upon actuation of the fluidic actuator and/or
resist the movements of a body part of a user upon actuation of the fluidic actuator to provide a tactile and/or force haptic sensation to a body part of a user.

2. The haptic device of claim 1 wherein the device permits the movements of the body part of the user, with or without actuation of the fluidic actuator, to receive tactile and/or force haptic inputs from said body part.

3. The haptic device of claim 1, further comprising means for fixing the device to the body part of a user.

4. The haptic device of claim 1, wherein the displacement performed by the movable members is a relative movement of said movable members one to another.

5. The haptic device of claim 1, wherein the plurality of inflatable portions is configured to provide, upon actuation, a displacement of more than one movable member.

6. The haptic device of claim 1, comprising a plurality of fluidic actuators configured to provide, upon actuation, a displacement of more than one movable member.

7. The haptic device of claim 1, wherein said movable members are mechanically interconnected between them.

8. The haptic device of claim 7, wherein said movable members are mechanically interconnected via joints.

9. The haptic device of claim 8, wherein said joints accommodate at least part of a fluidic actuator or an inflatable portion thereof.

10. The haptic device of claim 1, further comprising at least one sensor located on at least one of the fluidic actuator(s) and a movable member.

11. The haptic device of claim 1, further comprising a housing for hosting said fluidic actuator(s).

12. A system comprising the haptic device of claim 1 operatively connected with the pumping means.

13. The system of claim 12, further comprising a computer device operatively connected with said pumping means and/or said haptic device, said computer device comprising instructions to activate said pumping means to operate the fluidic actuator(s).

14. The system of claim 13, wherein said computer device further comprises instructions for bidirectionally interacting with a user based on parameters sensed by sensors located on the haptic device.

15. A method for providing a haptic feedback to a user comprising the steps of:

providing a system according to claim 12;

allowing the user to contact the haptic device with a body part; and activating the pumping means to operate the fluidic actuator(s), thereby providing a displacement of said movable members and/or a resistance to the movements of the body part of the user, and therefore a tactile and/or force haptic sensation to the user.

16. The method of claim 15, wherein the step of activating pumping means comprises varying a fluid flow within the fluidic actuator(s) over time, thereby providing a dynamic displacement of said movable members and therefore a dynamic haptic sensation to the body part of the user.

17. The method of claim 15, wherein the step of activating pumping means comprises varying a fluid pressure within the fluidic actuator(s) over time, thereby providing a resistance with said movable members and therefore a haptic sensation to the body part of the user.

18. The method of claim 15, further comprising a step of permitting the movements of the body part of the user, and therefore receiving tactile and/or force haptic inputs from the body part of the user.

19. The method of claim 15, wherein said body part is a hand.

\* \* \* \* \*